March 1, 1949.   E. G. GUNN   2,463,459
LUBRICANT FLOW SYSTEM TO FILTER
Filed June 7, 1945
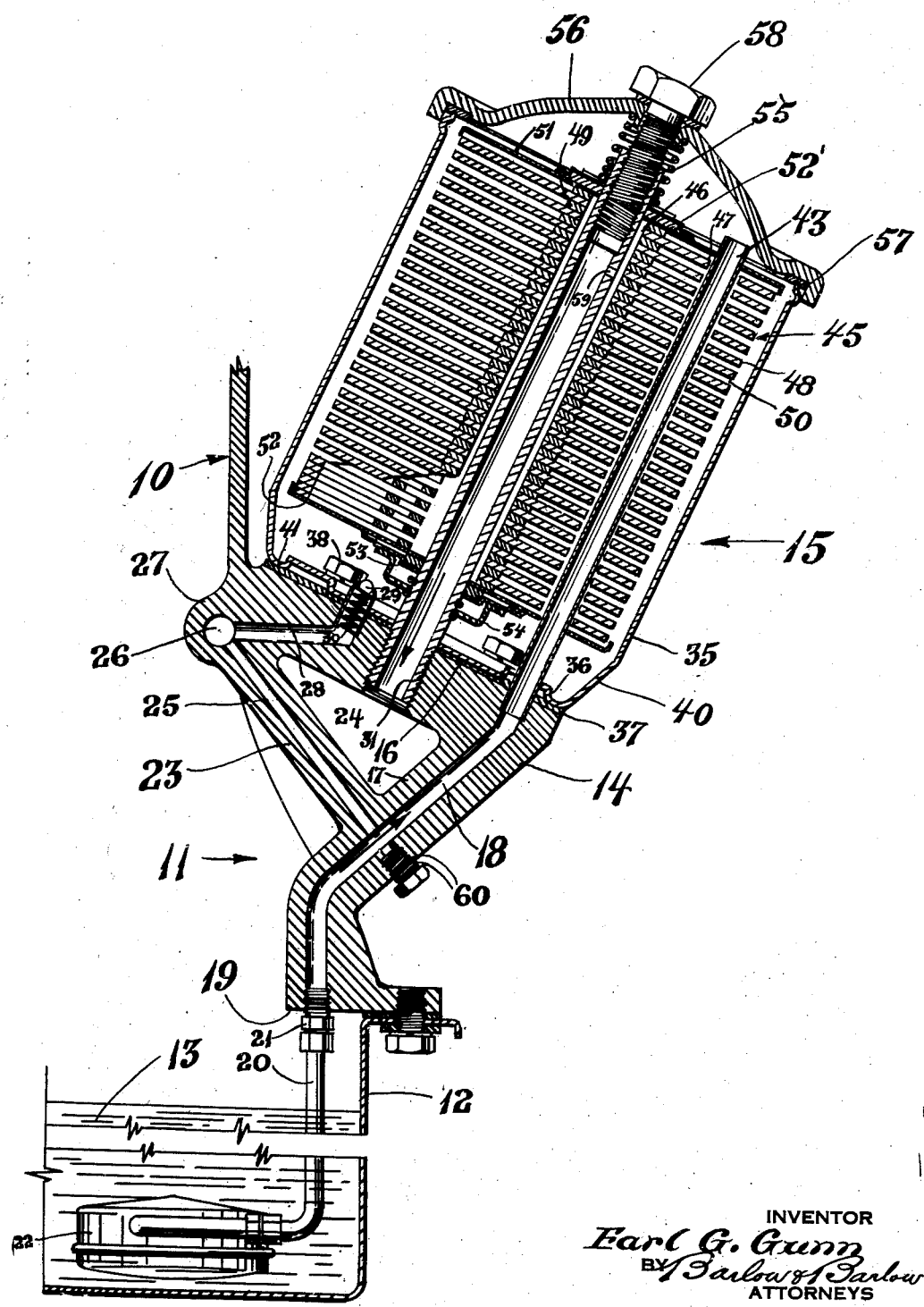
INVENTOR
Earl G. Gunn
BY Barlow & Barlow
ATTORNEYS Patented Mar. 1, 1949

2,463,459

UNITED STATES PATENT OFFICE 2,463,459

LUBRICANT FLOW SYSTEM TO FILTER

Earl G. Gunn, Providence, R. I., assignor to Fram Corporation, a corporation of Rhode Island Application June 7, 1945, Serial No. 598,137

5 Claims. (Cl. 184—6)

This invention relates to a conduit system for the lubricating oil of an engine, whereby the oil is conducted to a filter.

It is usual, in the lubricating system of an internal combustion engine, that the lubricating oil pass from a pump, which is located in or adjacent to the crankcase sump, to a pressure rib, from which rib it is led to all bearings and also to a filter. Certain types of filters rob a lubricating system, as above described, of a certain portion of the oil to be filtered.

One of the objects of this invention is to provide a system which will supply oil to the filter and to the pressure rib, without robbing the system of any oil except that which is filtered.

Another object of the invention is to obtain any required amount of warm oil through the filter.

Another object of this invention is to provide a filter of the base mounted type, which will contain the major portion of the required conduits for the flow lines therein.

With these and other objects in view, the invention consists of certain novel features of construction, as will be more fully described and particularly pointed out in the appended claims.

The figure is a sectional view of a filter, illustrating a system of flow of lubricant in the lubricating system.

In carrying out this system of lubricant flow in the internal combustion engine, I have provided a base upon which the filter casing is mounted and I have provided conduits in the base from the lubricant pump to and from the filter in a shunt relation to a flow line from the pump to the pressure rib. The arrangement is such that flow through the filter casing passes the filter element in the casing and this flow is in a shunt relation to the main line of flow of lubricant to the point of use.

With reference to the drawing, 10 designates the engine block and 11 the crankcase which in this particular showing is all of a single piece of material, or one casting, while 12 designates the oil pan, which provides a reservoir for lubricant designated 13. Integral with the crankcase 11 there is a protuberance or boss 14 which extends outwardly from the usual shape of the crankcase and which provides a base for mounting a filter designated generally 15.

The base 14 as illustrated in the drawing extends outwardly from the crankcase 11 and provides a surface 16 which is at an angle to a horizontal plane. This surface provides an area generally circular in shape, for the mounting of the filter casing of the filter designated generally 15. Along one edge of the protuberance there is a thickened portion 17, which has a conduit 18, formed therein, extending to a location at 19 to which a supply line or pipe 20 is connected as at 21, from a pump 22 which is immersed in the reservoir 13 of lubricant. A portion 23 extends across the generally hollowed portion 24 to provide a conduit 25 connecting with the pressure rib 26 in the enlarged portion 27 of the crankcase, thus the conduit 25 connects the conduit 18 with the pressure rib. A conduit 28 extends from the pressure rib also to the surface 16 and has a ball valve 29 mounted to control this conduit, the same being pressed to closed position by spring 30. A center tube 31 is threaded into the protuberance to empty into the hollow portion 24 and to extend upwardly from the surface 16.

The filter 15 consists of a casing 35 having a bottom wall 36 to engage with a gasket 37 on the face 16 of the protuberance and is secured in place by bolts 38 extending through the bottom wall and gasket into the thickened portion of the protuberance to securely bolt casing 35 in position. Casing 35 is a generally cylindrical casing which is larger than the circular area of the surface 16 and is tapered down to a size to fit the surface. Bottom wall 36, although shown as extending completely across the filter case, need not be complete as the rolled portions 41 engaging the gasket 37 may serve to provide a tight seal for the casing on the protuberance 14. A standpipe 43 extends upwardly from the conduit 18, generally parallel to the axis of the filter casing 35, and the center tube 31, so that the oil entering the filter passes upwardly through this standpipe 43 to be discharged at its upper end.

A filter element or cartridge 45 has a central opening 46 to receive the center tube 31, while it has an opening 47 for the reception of the standpipe 43. This filtering element may be any one of a variety of forms which will clean the oil on a single pass therethrough, but as here shown consists of a plurality of discs 48 and controllers or separators 49, providing spaces or cells 50 for the collection of contaminant between them. End plates 51 at the top and 52 at the bottom are held in place by any suitable means for handling the filter element or cartridge as a unit. These end plates also carry gaskets 52' in the top and 53 in the bottom to seal the top and bottom plates with the center tube. A support 54 is secured to the center tube, providing an abutment for the filter element 45, which is pressed into engagement with this abutment by a spring 55 as the cover 56 is moved into sealing position on the gasket 57 which engages the upper edge of the casing 35. This cover is held in position by a bolt 58 which has threaded engagement with the center tube 31. The center tube is provided with passages 59 so that filtrate which reaches the central opening 46 of the element may flow through the passages 59 into the center tube 31 and be discharged through its lower end.

A plug 60, opposite the opening 25, serves as a means for cleaning this opening, or a means through which the opening may be bored when originally formed.

In operation lubricant 13 is pumped from the reservoir in the sump of the oil pan up through the conduit 18, through the standpipe 43, to the upper part of the filter. The flow from the upper end of this standpipe will be about the periphery of the filter element and outwardly through the ball valve 29, which will be depressed as soon as any pressure occurs in the filter, so that the flow will be out through this ball valve and to the pressure rib 26, while other liquid will flow through the conduit 25 directly from the passage 18 to the pressure rib 26. The flow through the portions 25 and through the standpipe and ball valve part of the circuit will be in a shunt relation and will vary inversely as the resistance of these circuits. The resistances are obtained by the relative size of the openings which are predetermined as to the size of the bore made. Pressure will be maintained in the filter about the filter element while no pressure will exist in the center tube and the opening 46 which receives this center tube. Consequently, some of the lubricant will pass from about the filter element through the filter element to the center axial opening 46 thence through the openings 59 into the center tube and downwardly as shown by the arrow therein, back to join the reservoir oil 13. The pressure will open ball valve 29 so that oil will pass by the filter element and cause heating of the filter to take place. Filtration of clean oil only will be taken from the lubricant circulating system. As soon as the engine stops and the pump 22 stops operating, the ball valve 29 will serve to maintain the liquid in the filter up to the level of the top of the standpipe 43.

I claim:

1. In combination with a portable internal combustion engine, having a circulating lubricating system, including a reservoir for lubricant which may be contaminated, a pump to withdraw lubricant therefrom and circulate the same to a point of use, eventually returning the lubricant to the reservoir, a filtering unit mounted on said engine and comprising a casing in said circulating system, having a continually open inlet conduit, an outlet conduit provided with means responsive to pressure of the lubricant to open the same for flow of the lubricant to the point of use and said flow by-passing the filter element, a filter element in said casing through which filtrate passes from the lubricant in said casing and a separate conduit to return said filtrate to said reservoir.

2. A combination as set forth in claim 1 wherein the conduits of the circulating system which lead to the filter casing are within the internal combustion engine.

3. A combination as set forth in claim 1 wherein the pump and the conduits of the circulating system which lead to the filter casing are within the internal combustion engine.

4. A combination as set forth in claim 1 wherein the conduits of the circulating system which lead to the filter casing are formed in thickened portions of the engine walls adjacent the point of mounting of the filter casing.

5. A combination as set forth in claim 1 wherein the filter casing is of the base mounted type, and the conduits leading to the casing are in the mounting for the filter casing.

EARL G. GUNN.

REFERENCES CITED

The following references are of record in the file of this patent:

UNITED STATES PATENTS

| Number | Name | Date |
| --- | --- | --- |
| 1,844,611 | Spackman | Feb. 9, 1932 |
| 1,948,479 | Caminez | Feb. 20, 1934 |

FOREIGN PATENTS

| Number | Country | Date |
| --- | --- | --- |
| 405,281 | Germany | Nov. 3, 1924 |